(12) United States Patent
Frey et al.

(10) Patent No.: US 6,867,516 B2
(45) Date of Patent: Mar. 15, 2005

(54) DRIVE DEVICE WITH ANTI-LASH MECHANISM

(75) Inventors: Ronald Frey, Bönnigheim (DE); Friedrich Kaiser, Mainz-Amoneburg (DE); Johannes Helmich, Wertheim (DE); Josef Klar, Löchgau (DE); Werner Baeskow, Hessigheim (DE)

(73) Assignee: Valeo Motoren und Aktuatoren GmbH (DE)

( * ) Notice: Subject to any disclaimer, the term of this patent is extended or adjusted under 35 U.S.C. 154(b) by 0 days.

(21) Appl. No.: 10/332,153

(22) PCT Filed: Jul. 2, 2001

(86) PCT No.: PCT/EP01/07555
§ 371 (c)(1),
(2), (4) Date: Jul. 28, 2003

(87) PCT Pub. No.: WO02/02968
PCT Pub. Date: Jan. 10, 2002

(65) Prior Publication Data
US 2004/0012280 A1 Jan. 22, 2004

(30) Foreign Application Priority Data
Dec. 12, 2001 (DE) .......................... 101 60 845

(51) Int. Cl.[7] ............................. H02K 21/12; F16H 1/16
(52) U.S. Cl. ......................... 310/51; 310/75 R; 74/425
(58) Field of Search ................................. 310/91, 75 R, 310/90, 83, 156.74, 232, 235, 89; 74/89.14, 425, 427; 384/223, 245

(56) References Cited

U.S. PATENT DOCUMENTS

| | | | | |
|---|---|---|---|---|
| 4,369,387 A | * | 1/1983 | Haar et al. ................. 310/83 |
| 4,382,200 A | * | 5/1983 | Street .......................... 310/157 |
| 4,452,541 A | * | 6/1984 | Carpenter ................... 384/223 |
| 4,734,600 A | * | 3/1988 | Bergan et al. ................ 310/51 |
| 4,790,202 A | * | 12/1988 | Hayashi et al. ............... 74/396 |
| 4,885,948 A | * | 12/1989 | Thrasher et al. ........... 74/89.14 |
| 4,900,957 A | * | 2/1990 | Barker et al. ................. 310/62 |
| 5,168,186 A | * | 12/1992 | Yashiro ....................... 310/47 |
| 5,212,999 A | * | 5/1993 | Kitada .......................... 74/425 |
| 5,325,736 A | * | 7/1994 | Tsujita .......................... 74/425 |
| 5,352,950 A | * | 10/1994 | Shirasaki ............... 310/323.11 |
| 5,387,835 A | * | 2/1995 | Tsukimoto et al. ..... 310/323.13 |
| 5,747,903 A | * | 5/1998 | Klingler .................... 310/75 R |
| 5,912,520 A | * | 6/1999 | Kobayashi et al. ........... 310/80 |
| 6,229,233 B1 | * | 5/2001 | Torii et al. ................ 310/75 R |
| 6,507,132 B2 | * | 1/2003 | Nakano et al. ................ 310/51 |
| 6,507,135 B1 | * | 1/2003 | Winkler ....................... 310/91 |
| 6,707,177 B1 | * | 3/2004 | Campbell et al. ............. 310/45 |
| 6,708,796 B2 | * | 3/2004 | Kinme et al. ............... 180/444 |

FOREIGN PATENT DOCUMENTS

| | | |
|---|---|---|
| EP | 0412238 | 2/1991 |
| EP | 0521645 | 1/1993 |

* cited by examiner

*Primary Examiner*—Burton S. Mullins
*Assistant Examiner*—Heba Elkassabgi
(74) *Attorney, Agent, or Firm*—Young & Basile, P.C.

(57) ABSTRACT

A drive device includes an electric drive motor, a housing with a housing cover, at least one shaft that is powered by the drive motor and compensating element(s) for compensating the axial play of the shaft. The compensating elements include at least one axially elastic, deformable elastomer element having at least one contact surface. The contact surface(s) has a PTFE, PET or corresponding coating.

21 Claims, 5 Drawing Sheets

DRIVE DEVICE WITH ANTI-LASH MECHANISM

BACKGROUND

The invention relates to a drive device having an electric drive motor, a casing, preferably with a casing cover, with at least one shaft driven by the drive motor and with compensating means to compensate for the axial lash of the shaft, where the compensating means contain at least one axially deformable elastomer element with at least one contact surface. The invention also relates to such an elastomer element.

In the following, description the shaft driven by the drive motor is understood to mean an output shaft driven by a drive motor through a gear, specifically a worm gear, as well as an armature shaft driven directly by the drive motor.

Drive devices of this kind find a use particularly in vehicles as actuator motors for seat adjustments, steering column adjustments, window regulators, sliding sunroofs, and as drive devices for windshield wiper systems. The drive devices normally have a worm gear connected in series with the drive motor, the gear being advantageously of small dimensions, capable of transmitting high levels of power and being self-locking.

Specifically because of the tapered flanks of the worm shafts and of the worm wheel in a worm gear of this type, an axial force acts on the armature shaft of the drive motor during operation of the drive device, as well as on the output shaft of the worm gear. The direction of the axial forces depends on the direction of rotation of the armature shaft. With a change in direction of the drive motor or a change in external load, the direction of the axial force on the armature shaft as well as on the output shaft is reversed, because the worm wheel is loaded in the opposite direction. Because of manufacturing tolerances in the individual components of the drive device and because of operating wear in the area of the axial bearings of the shaft, relatively large, undesirable axial lash can develop in the various shafts. As a consequence of axial lash of this kind, abrupt starting motions and irritating noises can result when the drive motor reverses direction. In addition, it is difficult to achieve precise positioning when starting or reversing a window that is being opened, for example, or a sliding sunroof.

Furthermore, noticeable relative motions can result if the drive device is used, for example, as an actuator motor for a seat back adjuster, and the driver perceives the axial lash as a relative motion of the seat back, even when the motor is not running. This phenomenon is additionally known in the case of steering column adjustments.

A drive device of this type is know from DE 38 15 356 A1 which has a contact button at the free end of the shaft as a compensating means to compensate for axial lash in a shaft, the button bearing against the contact surface of a carbide plate of a rubber-like carbide component, where the layer of rubber is disposed between the carbide plate and the drive device casing. A device of this kind has the disadvantage that firstly the contact button as well as the carbide plate have to be of hardened material in order to be able to withstand the extremely high pressure forces acting locally on the plate or the contact surface, respectively, without damage to the contact button or to the carbide plate. Furthermore, because of the weight of the carbide, a device of this kind has a relatively high overall weight, which cannot be ignored.

The object of the present invention is therefore to eliminate the previously enumerated disadvantages of the prior art.

SUMMARY

This object is achieved in the case of a drive device in accordance with the invention in which at least the one contact surface has a polytetrafluoroethylene, also known as PTFE, polyethylene terephthalate, also known as PET, or an equivalent coating.

The decisive advantage of a drive device in accordance with the invention is that the compensating means makes do without the use of a carbide plate. The contact surface of the elastomer element is coated directly with a suitable, material specifically, a PTFE coating. Precisely as the result of a coating of this kind on the contact surface, friction between the coated contact surface and the counter element rotating opposite the contact surface is minimized. Because no additional carbide plate is required, the number of components is reduced, resulting in a substantial reduction in manufacturing costs. Further, the weight of the entire drive device is reduced. The coating can be applied by vulcanization to the elastomer element.

A further development of the invention provides for the elastomer element to be located in a fixed manner against the casing or the casing cover with the side away from the coated contact surface. The elastomer element can be advantageously installed in pre-assembly preferably to the casing cover, which results in simplification of final assembly.

On the other hand, it is also conceivable that the elastomer element is located in a fixed manner on the shaft with the side away from the coated contact surface. In this instance, the elastomer element can be installed to the shaft in pre-assembly, which similarly simplifies final assembly.

Alternatively, it can of advantage for the elastomer element to be mounted in a floating manner between the shaft and the casing, or the casing cover. As a result of the floating mount, internal stress in the elastomer element which can negatively affect compensation of the axial lash in the shaft is reduced.

In accordance with the invention, the coated contact surface has a planar surface or, alternatively, a domed or mushroom-shaped surface. A planar surface suggests itself if the opposing surface corresponding to the contact surface is not planar, on the other hand, a domed or mushroom-shaped surface suggests itself if the opposing surface is a planar surface.

In a particularly advantageous embodiment of the invention, not only the contact surface of the elastomer element is configured as a planar surface, but the contact surface of the corresponding counter element also has a planar opposing surface. The advantageous result is that the coated contact surface is not subject to localized loading, but instead the load is distributed across its surface. Because the load on the coating of the elastomer element is distributed, stress peaks, which occur under localized loading, are avoided. As a consequence, the surface of the coated contact surface is less severely stressed, which substantially increases the life of the compensating means for compensating the axial lash of the shaft.

Advantageously under the invention, the elastomer element can be an elastomer disc. An elastomer disc of this kind can have two coated contact surfaces disposed parallel to each other, where preferably one contact surface runs against the casing or the casing cover, and the other contact surface preferably runs against the shaft. An elastomer element of this kind is specifically intended to be mounted in a floating manner. Because of the coating present on both sides, the elastomer disc can move relative to the shaft on the one hand, as well as move relative to the casing, or the casing cover, on the other. This minimizes any potential shear stress occurring in the elastomer disc, and its frictional characteristics are improved.

Under the invention it is also conceivable that the elastomer element is an elastomer washer, where the elastomer washer advantageously has two coated contact surfaces disposed parallel to each other, where preferably one contact surface runs against an annular collar on the casing or the casing cover, and the other contact surface runs preferably against an annular collar located on the shaft. A design of this kind for the invention has the specific advantage that the compensation for axial lash does not have to take place at the free ends of the shaft, but can take place at any point on the shaft. Positioning compensating means to compensate for axial lash at the ends of the shaft can be problematic, specifically for space reasons. The annular collar on the shaft can be formed, for example, by a flange located on the shaft, a pinion, a gear wheel or similar.

A further, decisive advantage of the use of elastomer discs, or elastomer washers, is that two or more elastomer discs, or elastomer washers, can be disposed axially parallel next to each other. This has the specific advantage that greater axial lash for various types of drive devices can be compensated for by one and the same elastomer discs, or elastomer washers. An elastomer disc, or elastomer washer of this kind can consequently find a use universally in different drive devices with axial lash of different magnitudes to be compensated. The elastomer discs or washers can be advantageously coated on both sides, whereby a mutual relative motion and a motion relative to the shaft or to the casing, or casing cover, can take place optimally because of the low friction. On the other hand, it is also conceivable that the elastomer discs have only one coated contact surface, where each of the coated contact surfaces can be positioned facing each other, or depending on the embodiment, also be positioned away from each other.

An elastomer disc or elastomer washer of this kind has, for example, a thickness of 2 mm, where a Teflon coating can then be about 0.3–0.5 mm.

In accordance with the invention, the contact surfaces have depressions or slits. Depressions or slits of this kind can act as receptacles for undesirable particles which penetrate between the contact surface and the counter-surface corresponding to the contact surface. This prevents particles of this nature from damaging the coated contact surfaces. As mentioned at the outset, the shaft can be a drive shaft driven by the drive motor through a gear, specifically through a worm gear. On the other band, it is also conceivable that the shaft is an armature shaft driven by the drive motor.

BRIEF DESCRIPTION OF THE DRAWING

Additional advantageous embodiments and details of the invention can be found in the description to follow, in which the invention is described and explained in greater detail with reference to the embodiments presented in the drawing.

DETAILED DESCRIPTION

Figure 1:
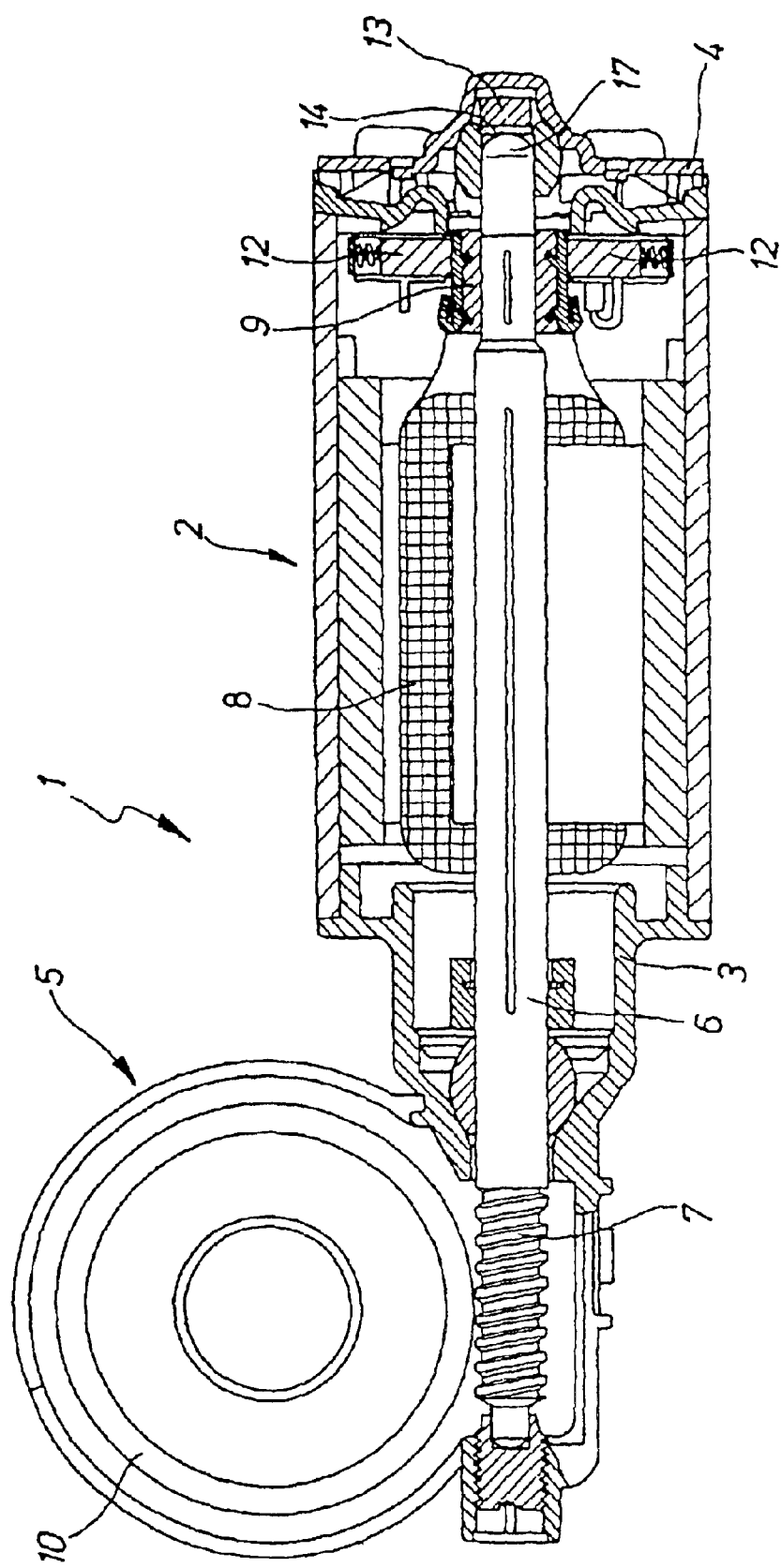
FIG. 1 is a longitudinal section of a drive device in accordance with the invention.

FIG. 1 shows a drive device 1 with an electric drive motor 2, with a casing 3 which has a casing cover 4, and a worm gear 5. The drive motor 2 has an armature shaft 6, on which a worm 7 is mounted on the side toward the worm gear 5. The worm 7 drives a worm wheel 10 on the worm gear 5. Furthermore, the armature shaft 6 has an armature 8 as well as a commutator 9. The electric motor 2 also has two brushes 12, whose free ends ride over the commutator 9 under spring pressure.

To compensate for any potential axial lash in the armature shaft 6, an elastomer element 13 is located in the pot-shaped casing cover 4, whose side facing the armature shaft 6 has a polytetrafluoroethylene coating, also known as PTFE. Alternatively, the coating may be polyethylene terephthalate, also known as PET, or an equivalent coating. A contact surface 14 of the PTFE coating on the elastomer element 13 facing the armature shaft 6 acts as a contact surface for the end 17 of the armature shaft 6 facing the elastomer element 13. The end of the shaft 17 matching the contact surface 14 is, as can be seen clearly from FIG. 1, configured as a dome. Advantageously the side of the elastomer element 13 away from the coating contact surface 14 is located in a fixed manner on the inside of the casing cover 4, so that the elastomer element 13 can be pre-assembled with the casing cover 4. When the casing cover 4 is bolted to the casing 3 of the drive motor 2, the elastomer element 13 is axially compressed, which causes an axial force on the armature shaft 6 that compensates for the axial lash. Because of the PTFE coating contact surface 14 on the elastomer element 13, friction between the shaft end 17 and the contact surface 14 is minimized. The contact surface 14 has a planar surface. As a result of the shaft end 17 having a domed configuration, the PTFE coating contact surface 14 is not loaded at one point, but over a circular area, which prevents stress peaks within the coating.

Figure 2:
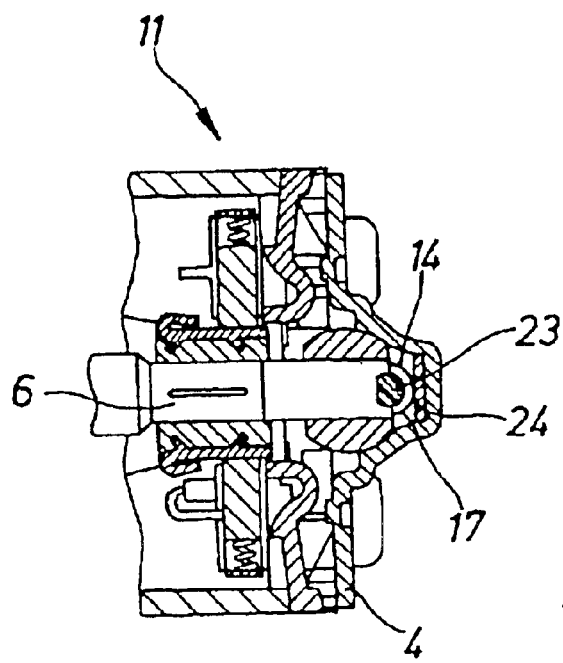
FIGS. 2 and 3 depict two further embodiments of the invention using partial longitudinal sections of drive devices in accordance with the invention.

The drive device 11 shown in FIG. 2 is essentially the same as the embodiment from FIG. 1. The difference is the way of compensating for axial lash. As is clear from FIG. 2, the end of the shaft 17 has an elastomer element 23 with a PTFE coating defining a contact surface 14. The elastomer element 23 with the side away from the coated contact surface 14 is located in a fixed manner on the shaft 6. The coated contact surface 14 of the elastomer element 23 is not planar in this embodiment, but domed. However, the counter element 24 corresponding to the contact surface 14 has a planar opposing surface. During installation of the casing cover 4, the elastomer element 23 is compressed axially, which creates an axial force compensating for the axial lash.

Figure 3:
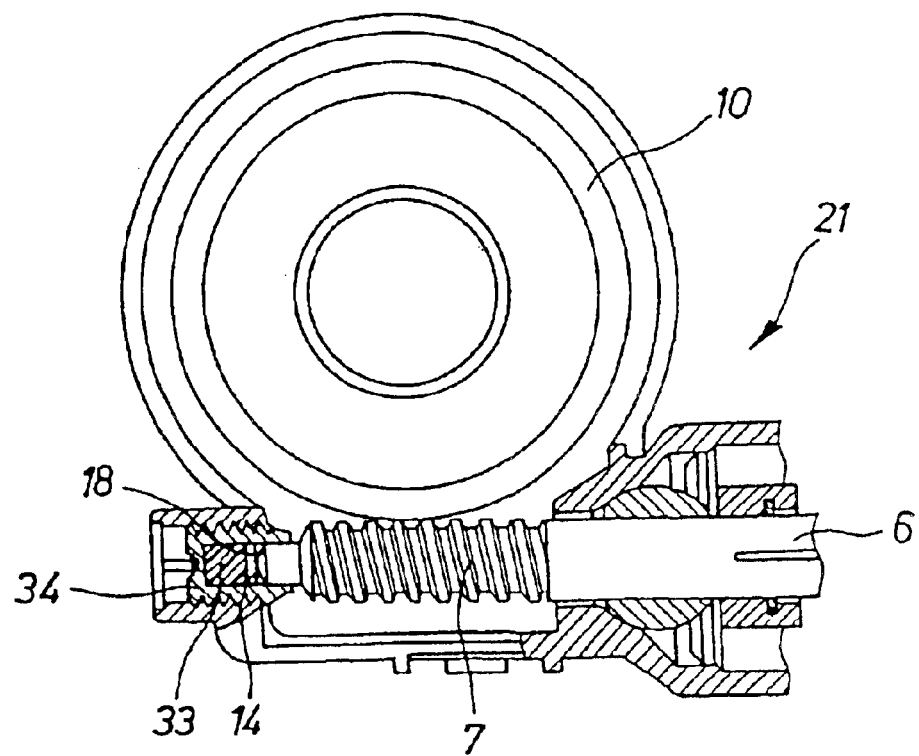

FIG. 3 shows a further embodiment of the drive device in accordance with the invention 21, in which the means to compensate for axial lash are present at the other end of the armature shaft 6. On the end 18 of the armature shaft 6, the armature shaft 6 is configured with a domed shape. The end of the shaft 18 runs against a PTFE coating defining a contact surface 14 of an elastomer element 33. The elastomer element 33 is located in a set screw 34 with an external thread, the screw being used for the precise adjustment of the axial lash of the armature shaft 6. By advancing the set screw 34, an adjustment can be made of how much the elastomer element 33 should be compressed in the axial direction and how high the resulting axial force to compensate for the axial lash should be. In place of the domed shaft end 18, it is also conceivable that the shaft end is designed as a flat, planar surface. Stress affecting the coating contact surface 14 in particular is reduced as a result.

Figure 4:
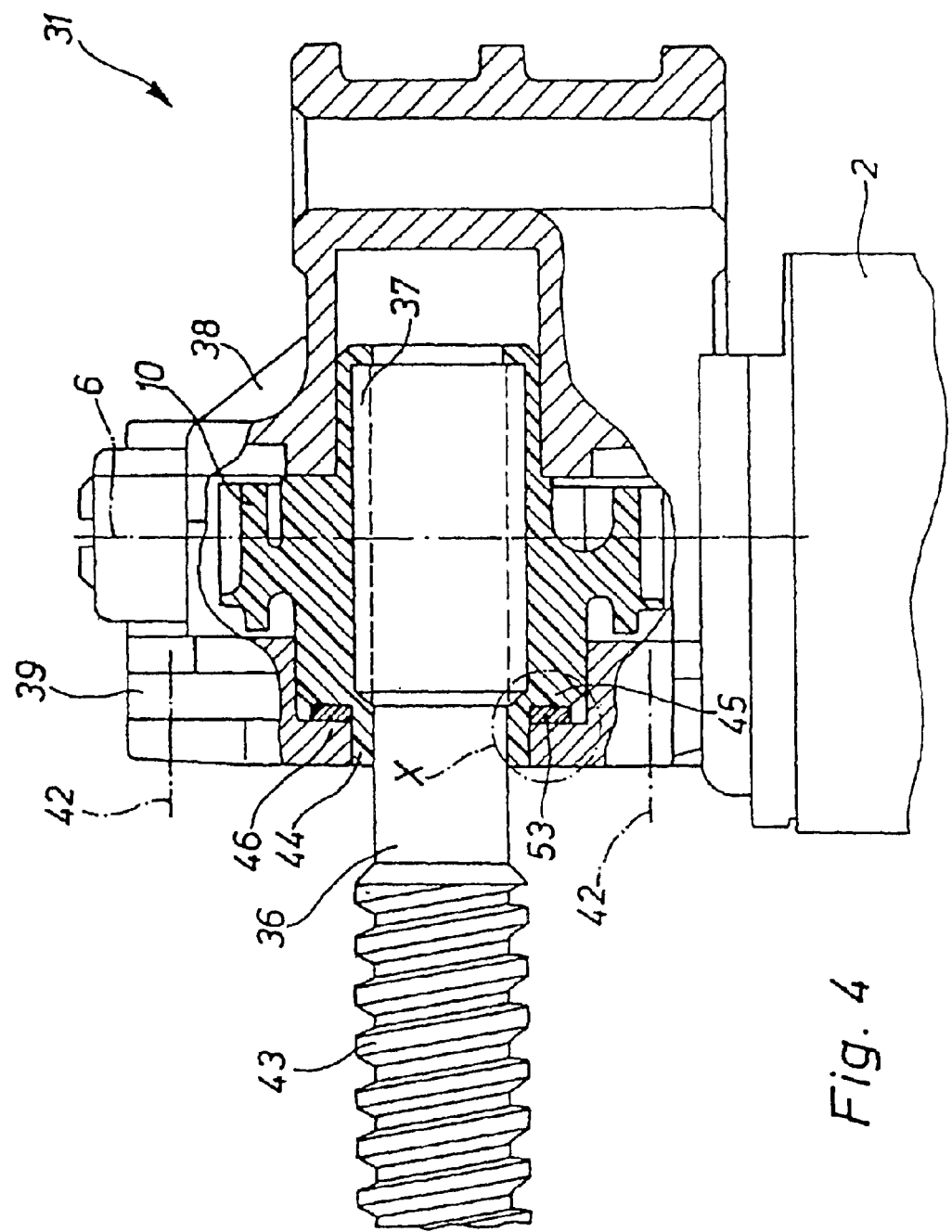
FIG. 4 is a partial longitudinal section of a further inventive drive device.

In the drive device 31 shown in FIG. 4, the intention is not to compensate for the axial lash of an armature shaft 6, as in accordance with FIGS. 1 to 3, but rather the axial lash of an output shaft 36 of a worm gear. FIG. 4 shows the drive motor 2, where the armature shaft (not seen) with the worm runs along the axis 6. The worm wheel 10 located on the shaft 36 can be clearly seen. The worm wheel 10 is molded on the output shaft 36 as a plastic part, the gear having straight-cut gears 37 in this area for a positive connection of the worm wheel 10 to the output shaft 36.

The worm gear is enclosed by a gear casing 38 which has a casing cover 39 which is bolted to the gear casing 38 with schematically indicated threaded fasteners 42. In the area of the output shaft 36 away from the worm wheel 10 there is a trapezoidal thread 43, on which a sliding block (not shown) can be disposed to drive the component to be operated by the drive device by means of a mechanism. The drive device shown in FIG. 4 is particularly suitable to drive a seat adjuster of a seat for motor vehicles.

An elastomer washer 53 is positioned on the output shaft 36, or on a shoulder 44 of the component carrying the worm wheel 10.

The component with the worm wheel 10 has an annular projection 45 against which an elastomer washer 53 acts. In addition, the casing cover 39 has an annular collar 46 on the side away from the elastomer washer 53, between which and the projection 45 the elastomer washer 53 is positioned. When the casing cover 39 is bolted down, the elastomer washer 53, is compressed in the axial direction, whereby an axial force impinges on the output shaft 36, compensating for the axial lash. FIGS. 5–8 show various embodiments of the elastomer washer 53, reproducing the section identified as X from FIG. 4.

Figure 5:
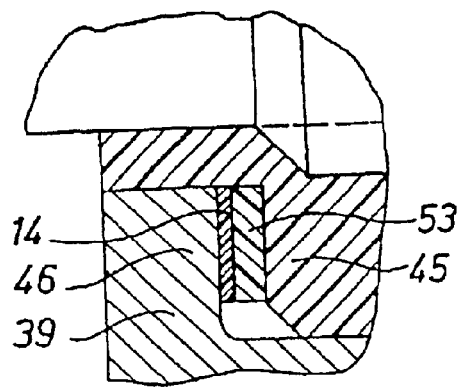
FIGS. 5 to 8 show sections from the drive device from FIG. 4 with various elastomer washers.

In accordance with FIG. 5, the elastomer washer 53 can have only one PTFE-coated contact surface.

Figure 6:
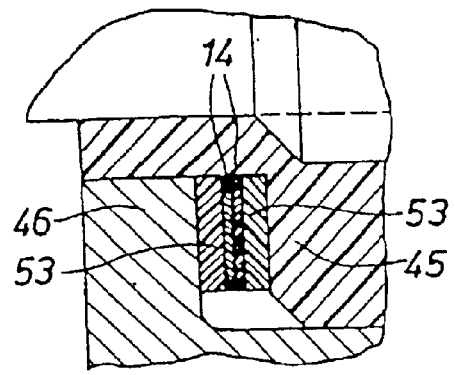

As shown in FIG. 6, it is also conceivable to use two elastomer washers 53, each of which has a PTFE-coated contact surface. The elastomer washers 53 can be installed such that the sides 14 of the two elastomer washers 53 with the PTFE coating face each other.

Figure 7:
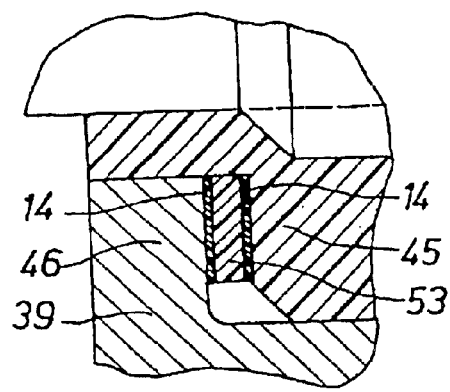

FIG. 7 show an aspect of the invention in which the elastomer washer 53 has two PTFE-coated contact surfaces 14 located parallel to each other, where one contact surface 14 acts against the casing cover and the other contact surface 14 acts against the projection 45.

Figure 8:
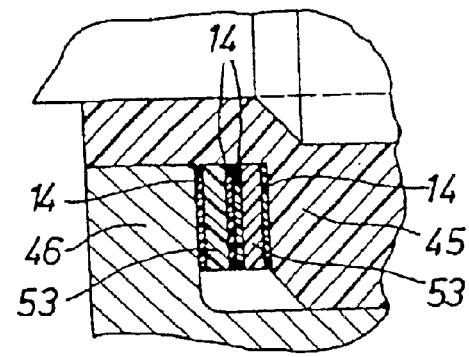

FIG. 8 show a further aspect in which two elastomer washers 53 coated on both sides are positioned axially next to each other. The result is optimal frictional characteristics combined with compensation for axial lash.

Depending on the axial play to be compensated, it is conceivable to position additional elastomer washers 53 axially next to each other. The elastomer washers 53 from FIGS. 7 and 8 are floating, which largely eliminates shear stress inside the elastomer washers 53.

The elastomer washers 53 from FIG. 5 or FIG. 6 are also floating, as a result of which the relative motion will occur largely between the two PTFE coatings or between the PTFE coating 14 and the annular collar 46 of the casing cover 39 because of the PTFE coating.

Figure 9:
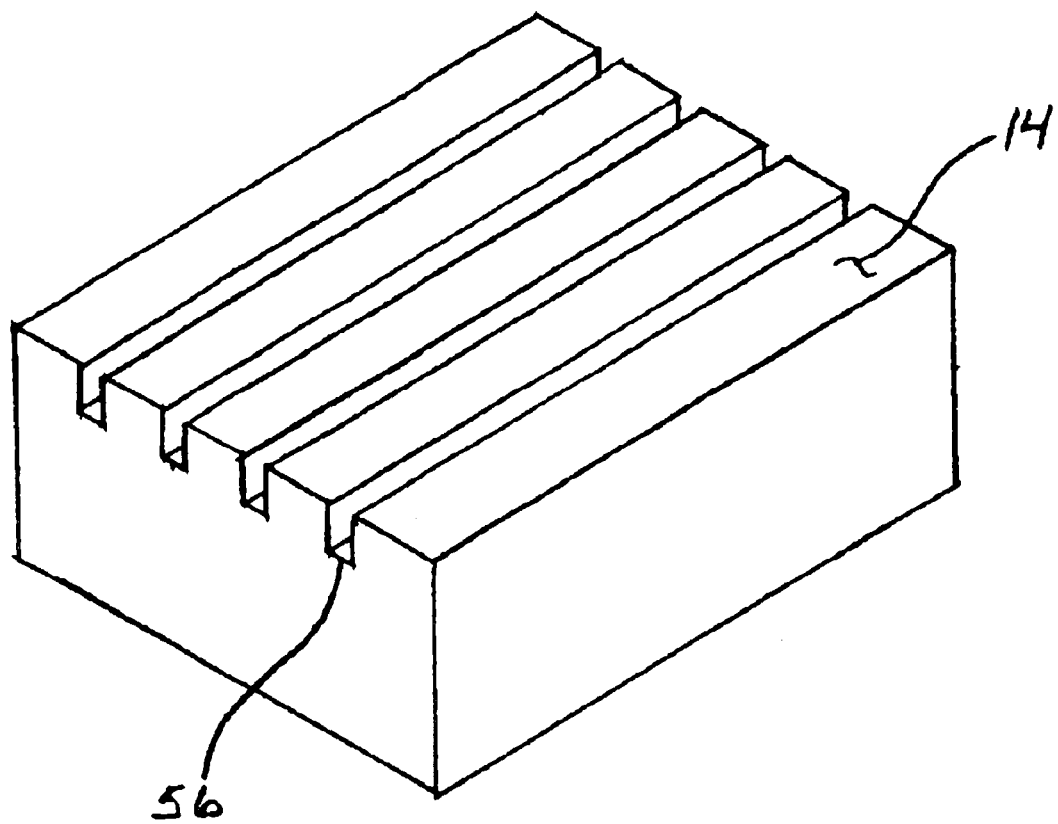
FIG. 9 illustrates a simplified perspective view of a contact surface having depressions or slits.

Advantageously the contact surfaces shown in FIGS. 1–8 can have depressions or slits 56 which can catch particles possibly contaminating the contact surfaces as illustrated generically in the simplified perspective view of FIG. 9.

All the features presented in the description, the claims to follow and the drawing can be essential to the invention both individually as well as in any combination.

What is claimed is:

1. A drive device with an electric drive motor, having a casing with a casing cover, with at least one shaft driven by the drive motor and with compensating means to compensate for the axial lash of the shaft, where the compensating means contain at least one axially elastically deformable elastomer element with at least one contact surface, characterized in that the at least one contact surface of the elastomer element has one of either a PTFE coating, a PET coating.

2. A drive device with an electric drive motor, having a casing with a casing cover, with at least one shaft driven by the drive motor and with compensating means to compensate for the axial lash of the shaft, where the compensating means contain at least one axially elastically deformable elastomer element with at least one contact surface, characterized in that the at least one contact surface has one of either a PTFE coating, or a PET coating, wherein the elastomer element is free to move relative to the shaft and one of either the casing and the casing cover.

3. The drive device from claim 2, wherein the elastomer element is disposed in a fixed manner on one of either the casing and the casing cover with a side away from the coated contact surface.

4. The drive device from claim 2, wherein the elastomer element is disposed in a fixed manner on the shaft with a side away from the coated contact surface.

5. The drive device from claim 2, wherein the coated contact surface has a planar surface.

6. The drive device from claim 2, wherein the coated contact surface has a non-planar, domed surface.

7. The drive device from claim 2, wherein a counter element corresponding to the contact surface has a planar opposing surface.

8. The drive device from claim 2, wherein the elastomer element is an elastomer disc.

9. The drive device from claim 8, wherein the elastomer disc has two coated contact surfaces disposed parallel to each other, where one surface runs against one of either the casing and the casing cover, and the other contact surface runs against the shaft.

10. The drive device from claim 8, wherein at least two elastomer discs are disposed axially parallel next to each other.

11. The drive device from claim 2, wherein the elastomer element is an elastomer washer located on the shaft.

12. The drive device from claim 11, wherein the elastomer washer has two coated contact surfaces disposed parallel to each other, where one contact surface runs against an annular collar located on one of either the casing and the casing cover, and the other contact surface runs against an annular collar located on the shaft.

13. The drive device from claim 12, wherein the annular collar for the shaft is formed by one of either a flange, a pinion, a gear, and a projection located on the shaft.

14. The drive device from claim 2, wherein the contact surfaces have one of either depressions and slits.

15. The drive device from claim 2, wherein the shaft is an output shaft driven by the drive motor through a gear.

16. The drive device from claim 2, wherein the shaft is an armature shaft driven by the drive motor.

17. An elastomer element of a drive device in accordance with claim 2.

18. In a drive device of the type having an electric motor, a shaft driven by the electric motor, a housing for supporting the shaft, and an elastomer element to compensate for axial lash of the shaft, the elastomer element being supported by the housing and having at least one surface facing the shaft, the improvement comprising:

a coating located on the at least one surface of the elastomer element facing the shaft and formed of one of either a PTFE material or, PET material.

19. A drive device for compensating for lash in an electrically driven geared mechanism having a housing and a shaft supported by the housing, the drive device comprising:

an elastically deformable elastomer member disposed between the housing and an end of the shaft, the elastomer member having at least one surface opposing the end of the shaft; and a coating formed of one of either a PTFE material or PET material applied to the at least one surface of the elastomer member opposing the end of the shaft.

20. The drive device of claim 19, wherein the contacting surface of the elastomer member has a curved shape.

21. The drive device of claim 19, wherein the contacting surface of the elastomer member is planar.

* * * * *